(12) United States Patent
Lin et al.

(10) Patent No.: US 6,757,428 B1
(45) Date of Patent: Jun. 29, 2004

(54) SYSTEM AND METHOD FOR COLOR CHARACTERIZATION WITH APPLICATIONS IN COLOR MEASUREMENT AND COLOR MATCHING

(75) Inventors: Siming Lin, Austin, TX (US); Dinesh Nair, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/375,453

(22) Filed: Aug. 17, 1999

(51) Int. Cl.[7] .................................................. G06K 9/00
(52) U.S. Cl. ........................ 382/165; 382/162; 382/164; 382/209; 382/219
(58) Field of Search ................................ 382/165, 162, 382/164, 168, 167, 118, 107, 209, 219; 348/30, 187; 209/580, 587; 356/240.1

(56) References Cited

U.S. PATENT DOCUMENTS

| | | | | |
|---|---|---|---|---|
| 5,085,325 A | * | 2/1992 | Jones et al. ................. | 209/580 |
| 5,410,637 A | | 4/1995 | Kern et al. ................. | 395/611 |
| 5,652,881 A | | 7/1997 | Takahashi et al. .......... | 395/615 |
| 5,751,450 A | | 5/1998 | Robinson ................... | 358/504 |
| 5,799,105 A | * | 8/1998 | Tao ............................ | 382/167 |
| 5,828,777 A | | 10/1998 | Suzuki ....................... | 382/135 |
| 6,229,921 B1 | | 5/2001 | Wenzel et al. .............. | 382/209 |
| 6,272,239 B1 | | 8/2001 | Colla et al. ................. | 382/167 |
| 6,282,317 B1 | * | 8/2001 | Luo et al. ................... | 382/203 |
| 6,292,575 B1 | * | 9/2001 | Bortolussi et al. .......... | 382/118 |
| 6,625,308 B1 | | 9/2003 | Acharya et al. ............. | 382/168 |

FOREIGN PATENT DOCUMENTS

| | | | | |
|---|---|---|---|---|
| EP | 0 657 839 | | 6/1995 | ............ G06K/9/48 |
| EP | 0 751 475 | | 1/1997 | ............ G06K/9/46 |
| JP | 408166381 A | * | 6/1996 | .......... G01N/33/38 |
| WO | WO 99/20056 | * | 4/1999 | .......... H04N/13/02 |
| WO | 99/23600 | | 5/1999 | ............ G06K/9/00 |

OTHER PUBLICATIONS

Terry Caelli and David Reye "On the Classification of Image Regions by Colour Texture and Shape," Pattern Recognition, vol. 26, No. 4, pp 461–470, 1993.
Michael J. Swain and Dana H. Ballard "Color Indexing," International Journal of Computer Vision, 7:1, pp. 11–32, 1991.
Marie–Pierre Dubuisson and Anil K. Jain "Fusing Color and Edge Information for Object Matching," IEEE, pp. 982–986, 1994.
Partial International Search Report, Application No. PCT/US 00/22554, mailed Jan. 26, 2001.

(List continued on next page.)

*Primary Examiner*—Anh Hong Do
(74) *Attorney, Agent, or Firm*—Meyertons Hood Kivlin Kowert & Goetzel, P.C.

(57) ABSTRACT

A color characterization method operates to analyze each respective pixel of at least a subset of the pixels of an image object. The image is obtained in HSI format, or alternatively converted from another format to HSI. For each respective pixel, the method determines a color category or bin for the respective pixel based on values of the respective pixel. The color category is one a plurality of possible color categories or bins in the HSI color space. As the pixels are analyzed and assigned to color categories, the method stores information in tho computer regarding the number or percentage or pixels in each of the color categories. A color matching method uses the color characterization method. The color matching method determines similarity of colors between a template image object and a region of interest (ROI). The color matching method first performs the above color characterization technique on each of a template image object and a ROI (region of interest) and then generates match information based on the color information of the template image object and the color information of the ROI, wherein this match information indicates the similarity of colors between the template image object and the ROI.

46 Claims, 10 Drawing Sheets

OTHER PUBLICATIONS

Partial International Search Report, Application No. PCT/US 00/22554, mailed Jul. 18, 2001.

K. Chen et al., "Similarity–Based Retrieved of Images Using Color Histograms", Proceedings of the SPIE, Jan. 26, 1999, XP000983710 chapters 2, 3.

J.R. Smith et al., "Tools and Techniques for Color Image Retrieval", San Jose, Feb. 1–2, 1996, Bellingham, SPIE, US, vol. 2670, Feb. 1, 1996, pp. 426–437, XPO0O642585, ISBN: 0–8194–2044–1 (whole document).

Datacube, Inc."Intelligent and Optimal Normalized Correlation for High–Speed Pattern Matching", Feb. 2000, 13 pages.

IMAQ™ "IMAQ Vision Concepts Manual" Oct. 2000, pp. 14–18 through 14–25.

Vertan et al. "Embedding fuzzy logic in content based image retrieval" 19th International Conference of the North American Fuzzy Information Processing Society 2000, pp. 85–89, Jul., 2000.

Han et al., "Fuzzy color histogram: an efficient color feature for image indexing and retrieval," Proc. 2000 ICASSP IEEE, vol. 4, pp. 2011–2014, Jun., 2000.

\* cited by examiner

SYSTEM AND METHOD FOR COLOR CHARACTERIZATION WITH APPLICATIONS IN COLOR MEASUREMENT AND COLOR MATCHING

FIELD OF THE INVENTION

The present invention relates to characterizing colors in an image, as well as to measuring colors in an image and matching colors between different image objects in a template and a target image.

DESCRIPTION OF THE RELATED ART

In machine vision applications, color is a powerful descriptor that often simplifies object identification and extraction from a scene. Color characterization, location, and comparison is an important part of machine vision and is used in a large class of assembly and packaging inspection applications. Inspection involves verifying that the correct components are present in the correct locations. For example, color may be used to inspect printed circuit boards containing a variety of components; including diodes, resistors, integrated circuits, and capacitors. These components are usually placed on a circuit board using automatic equipment, and a machine vision system is useful to verify that all components have been placed in the appropriate positions. A method of effectively characterizing and locating components on a circuit board is desired.

Color is widely used in the automotive industry to verify the presence of correct components in automotive assemblies. Components in these assemblies are very often multicolored. For examples, color characterization may be used to characterize and inspect fuses in junction boxes, i.e. determining if all fuses are present and in the correct locations. In addition, it is often necessary to match a fabric in one part of a multi-color automobile interior. A method of characterizing a multi-colored area for analysis and comparison is desirable. A color characterization may be used to determine which of several fabrics is being used as well as the orientation (texture) of the fabric. In a manufacturing environment, color matching techniques may also be used to find flaws in a manufactured product, assuming the flaws are accompanied by a color change.

A direct measurement of the color distribution in an object may also be useful in machine vision applications. Instead of matching colors between the target image and the template image, a quantitative representation of the color distribution is produced. This data may then be used for further manipulation of the color information in machine vision applications. For example, a color measurement machine vision system may be used to test and analyze the color components in textiles or dyes. A quantitative representation is also useful in color image segmentation and color image retrieval. For example, an object in an image may be segmented based on its color, and an image may be retrieved from an image database based on its color representation.

A color space (or color model) is a way of representing colors and their relationship to each other. A color space is essentially a 3-D coordinate system and a subspace within that system where each color is represented by a single point or vector. Image processing and machine vision systems use several different color spaces including RGB, HSI (or HSL) and CMY. In the RGB space, each color appears in its primary spectral components of red, green and blue. This RGB color space is based on a Cartesian coordinate system. The RGB model is represented by a 3-dimensional cube with red, green, and blue at the edges of each axis. Each point in the cube represents a color, and the coordinates of that point represents the amount of red, green and blue components present in that color. Because the red, green, and blue color components in RGB color space are highly correlated, it is difficult to characterize colors with intensity/luminance independent features.

The Hue, Saturation, Intensity (HSI) or Hue, Saturation, Luminance (HSL) color space was developed to put color in terms that are easier for humans to quantify. The hue component is color as we normally think; such as orange, green, violet, and so on (a rainbow is a way of visualizing the range of hues). Thus, hue represents the dominant color as perceived by an observer. Saturation refers to the amount or richness of color present. Saturation is measured by the amount of white light mixed with a hue. In a pure spectrum, colors are fully saturated. Colors such as pink (red and white) and lavender (purple and white) are less saturated. The intensity or light component refers to the amount of grayness present in the image.

Colors represented in HSI model space may be ideal for machine vision applications for two reasons. First, HSI includes an intensity (luminance) component separated from the color information. Second, the intimate relation between hue and saturation more closely represents how humans perceive color. It is therefore desirable to characterize colors in HSI space for color measurement and color matching.

HSI is modeled with cylindrical coordinates. One possible model comprises the double cone model, i.e., two cones placed end to end or an inverted cone below another cone (see FIG. 4). For information on the double cone model, please see "A Simplified Approach to Image Processing", Randy Crane, Prentice Hall, 1997. The hue is represented as the angle theta, varying from 0 degree to 360 degree. Saturation corresponds to the radius or radial distance, varying from 0 to 1. Intensity varies along the z-axis with 0 being black and 1 being white. When S=0, the color is gray scale with intensity I and H is undefined. When S=1, the color is on the boundary of the top cone base and is fully saturated. When I=0, the color is black and therefore H is undefined.

On the assumption that the R, G and B values have been normalized to range from 0 to 1, the following equations may be used to convert from RGB color space to HSI (or HSL) color space:

$$I=(R+G+B)/3$$

$$H = \cos^{-1}\left\{\frac{\frac{1}{2}[(R-G)+(R-B)]}{[(R-G)^2+(R-B)(G-B)]^{\frac{1}{2}}}\right\}$$

$$S = 1 - \frac{3}{(R+G+B)}[\min(R,G,B)]$$

The Intensity I (or Luminance L) may also be represented by the equation:

$$L=0.299R+0.587G+0.114B$$

which is a weighted sum of the RGB values.

The equation for H yields values in the interval [0°, 180°]. If B/I>G/I then H is greater than 180° and is obtained as H=360°−H.

Prior art in color machine vision systems use various techniques to measure and match colors. Those skilled in the art will be familiar with 'thresholding' an image. To threshold a color image, a threshold is applied to each of the three planes that make up the image. In RGB mode, to select a particular color, one will need to know the red, green and blue values that make up the color. In RGB mode it is not possible to separate color from intensity. Therefore, a characterization algorithm such as histogram Intersection based on RGB space will be intensity sensitive. For more information on this, please see "Color Indexing", Michael J. Swain, Internal Journal of Computer Vision, vol. 7:1, page 11–32, 1991.

In the HSI color space, since the color and intensity information can be separated, one usually thresholds the color image in the hue plane to identify the dominant color (hue). However, it is difficult to distinguish multiple color objects by the thresholding technique, especially when the saturation has to be taken into account. Moreover, the black and white colors are the background colors in many machine vision applications and chromaticity(i.e. hue and saturation) can not be used to represent them. Therefore, The intensity value will also have to be used to represent black and white colors in the machine vision applications.

Prior art color matching techniques commonly calculate the color difference between corresponding pixels of a target object and a template object. These prior art techniques perform pixel by pixel comparisons or subtractions between pixels of the target object and pixels of the template object. The results of these pixel by pixel comparisons may then be compiled to determine the level of color similarity between the entire target object and template object. The computation cost of pixel by pixel comparison is very expensive and is difficult to accomplish in real time. A more efficient color characterization method is desirable. More specifically, it is desirable for machine vision applications to more effectively characterize and compare the colors in an image.

U.S. Pat. No. 5,410,637 (Kern) uses fuzzy logic to establish acceptable pass/fail tolerances for production or inventory samples. The process first stores a series of training image samples which are labeled pass or fail according to visual inspections. The initial value of the tolerance is a super ellipsoid determined by the high/low value of the pass samples in the training set. A classifier template uses the super ellipsoid tolerances and ranks every sample in the training set. The process then employs fuzzy logic to obtain an optimized tolerance which minimizes the sum of ranking error between the classifier template and the visual ranks. The process essentially builds a pass/fail color classifier. This process can not be used to measure the colors quantitatively in an image or to measure the quantitative color similarities between two objects in an image or in two separated images.

U.S. Pat. No. 5,085,325 (Jones) implements a color sorting system and method. The method creates a lookup table containing a series of 0's (accept) and 1's (reject) based on good and bad sample images. During the sorting process, the pixel value of the input image is used to address the lookup table, the output of the lookup table is either 1 or 0. If the number of rejects (1's) accumulated is larger than a specified number K, the input image is rejected. This color sorting method is based on a pixel by pixel comparison. A large memory is required to store the lookup table. Although a special hardware addressing approach can improve the processing speed, the cost of computation is still very high for sorting objects with complex colors.

U.S. Pat. No. 5,751,450 (Robinson) provides a method for measuring the color difference of two digital images as a single 'distance.' This 'distance' is an average of the color differences of all corresponding pixels of the two images. Similar to the Jones' patent as described above, the cost of computation of the distance is very high. This template image has to be stored in the computer memory for on-line color matching. If the size of the template and target image are not the same, special operations for alignment or resizing the image must be done before the matching process can begin. A further drawback of this approach is that it is impossible to have scale and rotation-invariant color matching based on the 'distance' measure.

SUMMARY OF THE INVENTION

In view of the foregoing, an object of the present invention is to provide improved systems and methods for effectively and accurately characterizing color for machine vision applications.

Another object of the invention is to provide a machine vision system for measuring multiple colors in an image. This color measuring is intensity independent within a large range of intensity variation.

Still another object of the invention is to provide a machine vision system for measuring multiple colors, including black and white color, while the color measuring system is intensity independent within a large range of intensity variation.

Still another object of the invention is to provide a machine vision system for measuring multiple colors with different saturation values in an image, while the color measuring system comprises a wide range of intensity variation and is intensity independent.

Still another object of the invention is to provide a machine vision system for color matching that may quantitatively measure the color difference between two images or between two regions of interest in the same image.

Still another object of the invention is to provide a machine vision system for color matching that is not required to calculate the color difference based on pixel by pixel comparisons.

Still another object of the invention is to provide a machine vision system for color matching that is intensity independent within a large range of intensity variation.

Still another object of the invention is to provide a machine vision system for color matching that can distinguish colors with different saturation values.

Still another object of the invention is to provide a machine vision system for color matching that compensates for black and white color distribution in images.

The foregoing objects may be attained according to the present invention, which provides, in one aspect, an improved system and method for characterizing the colors in an image. More particularly, the present invention provides a system and method for effective on-line color measurement and color matching.

The color characterization method operates to characterize the colors of an image object or region of interest (ROI). The image is obtained in HSI format, or alternatively converted from another format to HSI. For example, an image may be acquired in HSI format by National Instruments color image acquisition board PCI-1411. The color characterization divides the HSI space into n color categories (also referred to as subspaces or bins), where n is the number of color categories of interest. The number of different color categories in the color space may be dependent on a desired complexity of the color characterization.

For each image object pixel, the method determines a color category for the respective pixel based on values of the respective pixel, i.e., hue, saturation and intensity values, wherein the color category is one a plurality of possible color categories or bins (or sub-spaces) in the HSI space. The number of pixels assigned to each category is then counted and normalized by the total number of pixels in the selected region of interest (or entire image), i.e., the percentage of pixels in each color category characterizes the colors of the image or ROI. The percentage of pixels in each color category may also be used as a quantitative measurement of the color distribution of the image.

In one embodiment, the method first divides the double cone HSI color into sub-spaces so that each subspace represents a color category. All the categories together include every possible color, including black and white. In the color characterization process, the method determines if the respective pixel can be categorized as either black or white based on one or more of the saturation and intensity values of the respective pixel. If the respective pixel can not be categorized as either black or white, then the method determines a color category for the respective pixel based on hue and saturation values of the respective pixel. Thus the method operates to determine a color category for the respective pixel based on hue, saturation and intensity values of the respective pixel.

As the pixels are analyzed and assigned to color categories, the method stores information in the computer regarding the number of pixels in each of the color categories. The method may then compute a percentage of the pixels in each of the color categories, wherein this percentage information characterizes colors in the image object. The characterization information may then be output to a computer screen or other device for further color analysis in machine vision applications.

The invention further includes an improved color matching method that uses the color characterization method described above. The color matching method determines similarity of colors between a template image object and a region of interest (ROI) or target image object. The color matching method first performs the above color characterization technique on each of the template image object and the ROI to determine color information regarding the template image object and the ROI. For each of the template image object and the ROI, the color information comprises information regarding a number or percentage of pixels in each of the color categories of a color space.

In one embodiment, the color characterization and/or color matching method may perform a smoothing operation (moving filtering) on the stored color information. The smoothing may comprise, for each respective color category, distributing a portion of the number or percentage of pixels in the respective color category to one or more neighboring color categories. The color matching method then generates match information based on the color information of the template image object and the color information of the ROI, wherein this match information indicates the similarity of colors between the template image object and the ROI. The match information may be generated for each respective color category by comparing the number or percentage of template image object pixels in the respective color category with the number or percentage of ROI pixels in the respective color category. For example, the absolute distance may be used to calculate the difference of the percentages for each category and these differences summed (or weighted summed) to produce a match or score value. Where the color matching is based on percentages of colors in respective color categories, rather than the number of pixels in each category, matching may be performed between two images regardless of their respective sizes and orientation, and without expensive calculations to retest for different rotations or scales of the images.

BRIEF DESCRIPTION OF THE DRAWINGS

The file of this patent contains at least one drawing executed in color. Copies of this patent with color drawings will be provided by the Patent and Trademark Office upon request and payment of the necessary fee.

A better understanding of the present invention can be obtained when the following detailed description of the preferred embodiment is considered in conjunction with the following drawings, in which.

Figure 1:
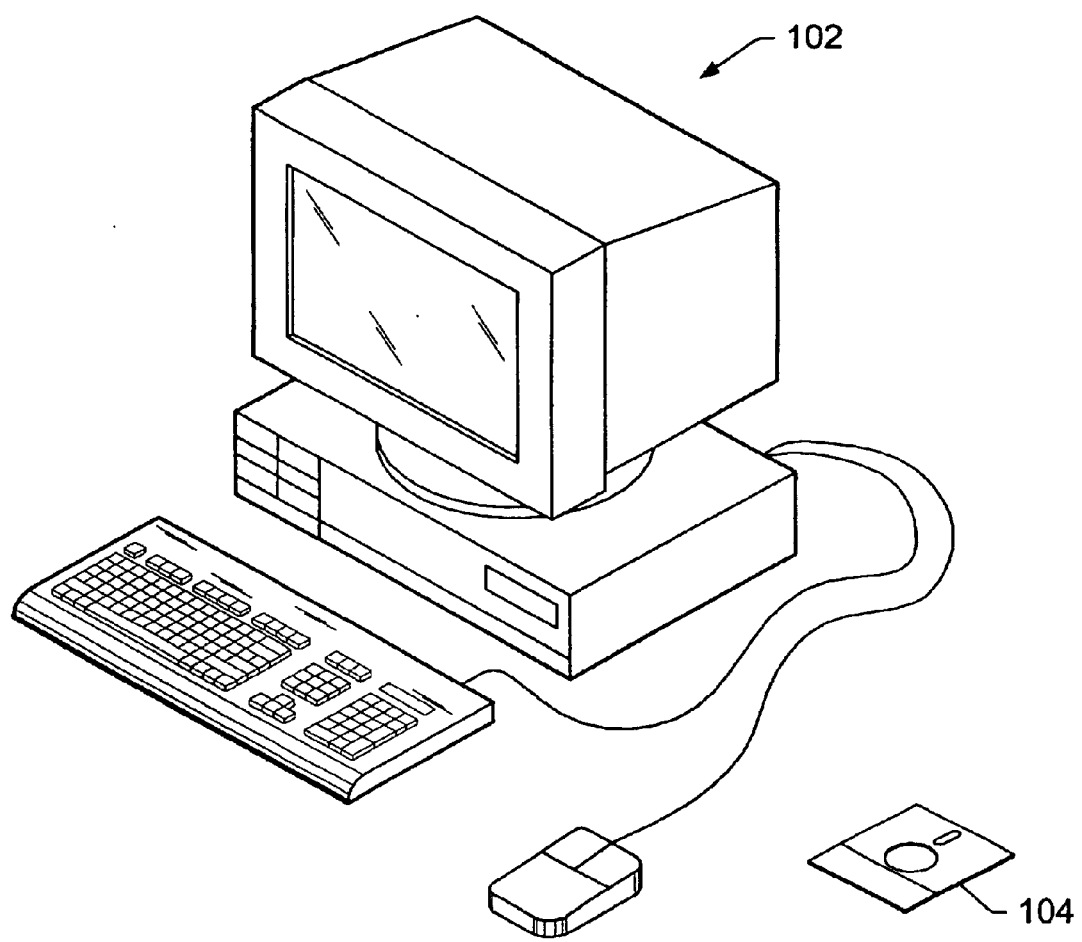
FIG. 1 illustrates a computer system which performs color characterization and/or color matching according to the present invention.

While the invention is susceptible to various modifications and alternative forms specific embodiments are shown by way of example in the drawings and are herein described in detail. It should be understood, however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE FIGURES

FIG. 1—Computer System

FIG. 1 illustrates a computer system 102 which may perform color characterization and/or color matching according to the present invention. The computer system 102 may comprise one or more processors, a memory medium, display, and an input device or mechanism, such as a keyboard or mouse, and any other components necessary for a computer system.

The computer system 102 performs color characterization analysis, including calculations performed on an image object and storage of results. The computer system 102 may also perform color matching analysis between two images or image objects. Images that are to be matched are preferably stored in the computer memory and/or received by the computer from an external device.

The computer system 102 preferably includes one or more software programs for performing the color characterization and/or color matching of the present invention. The software programs may be stored in a memory medium of the computer system 102. The term "memory medium" is intended to include various types of memory, including an installation medium, e.g., a CD-ROM, or floppy disks 104, a computer system memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The software program(s) may be implemented in any of various ways, including procedure-based techniques, component-based techniques, and/or object-oriented techniques, among others. For example, the software program may be implemented using ActiveX controls, C++ objects, Java Beans, Microsoft Foundation Classes (MFC), or other technologies or methodologies, as desired. A CPU, such as the host CPU, executing code and data from the memory medium comprises a means for performing color characterization and/or color matching according to the methods or flowcharts described below.

Figure 2:
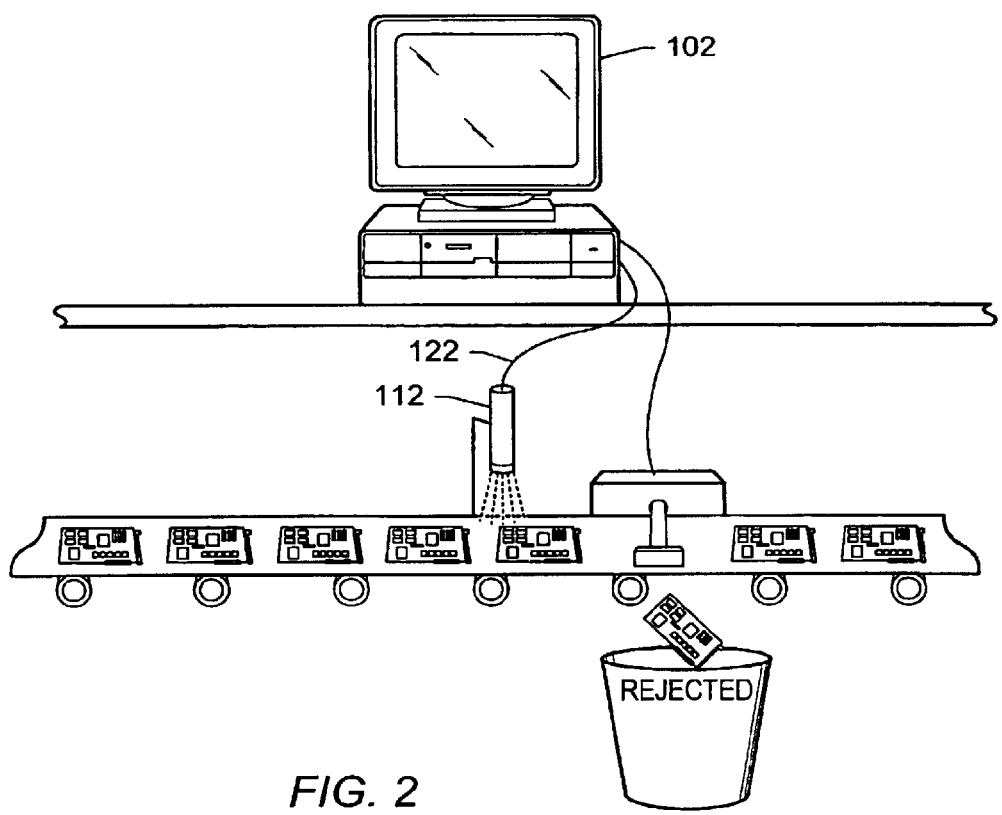
FIG. 2 illustrates an image acquisition (video capture) system for acquiring images.

FIG. 2—Machine Vision System

FIG. 2 illustrates a machine vision system or image acquisition system, which is an example of one application of the present invention. The color matching and/or color characterization techniques of the present invention may be used in various types of machine vision applications. For example, the computer 102 may be embodied in various form factors and/or architectures, e.g., a robot or embedded device, among others. It is also noted that the color characterization and/or color matching techniques of the present invention may be performed in any of various manners, either in software, programmable logic, or hardware, or a combination thereof.

In the machine vision system of FIG. 2, computer system 102 is coupled to a camera 112 and operates to receive one or more images. The computer system 102 may perform color characterization to characterize the colors in an image. The computer system 102 may also perform color matching to compare the colors of two images or image objects, e.g., to compare the colors of a first image object or region of interest (ROI) with one or more other image objects or ROIs. The computer system of FIG. 2 is programmed according to the present invention to represent an image object or ROI using improved color characterization techniques and/or to perform the improved color matching methods of the present invention.

In the present application, the term "image object" is used to refer to either an entire image, or a portion of an image, e.g., a ROI. The term "ROI" is also used synonymously with the term "image object" to refer to a portion or all of an image.

Figure 3:
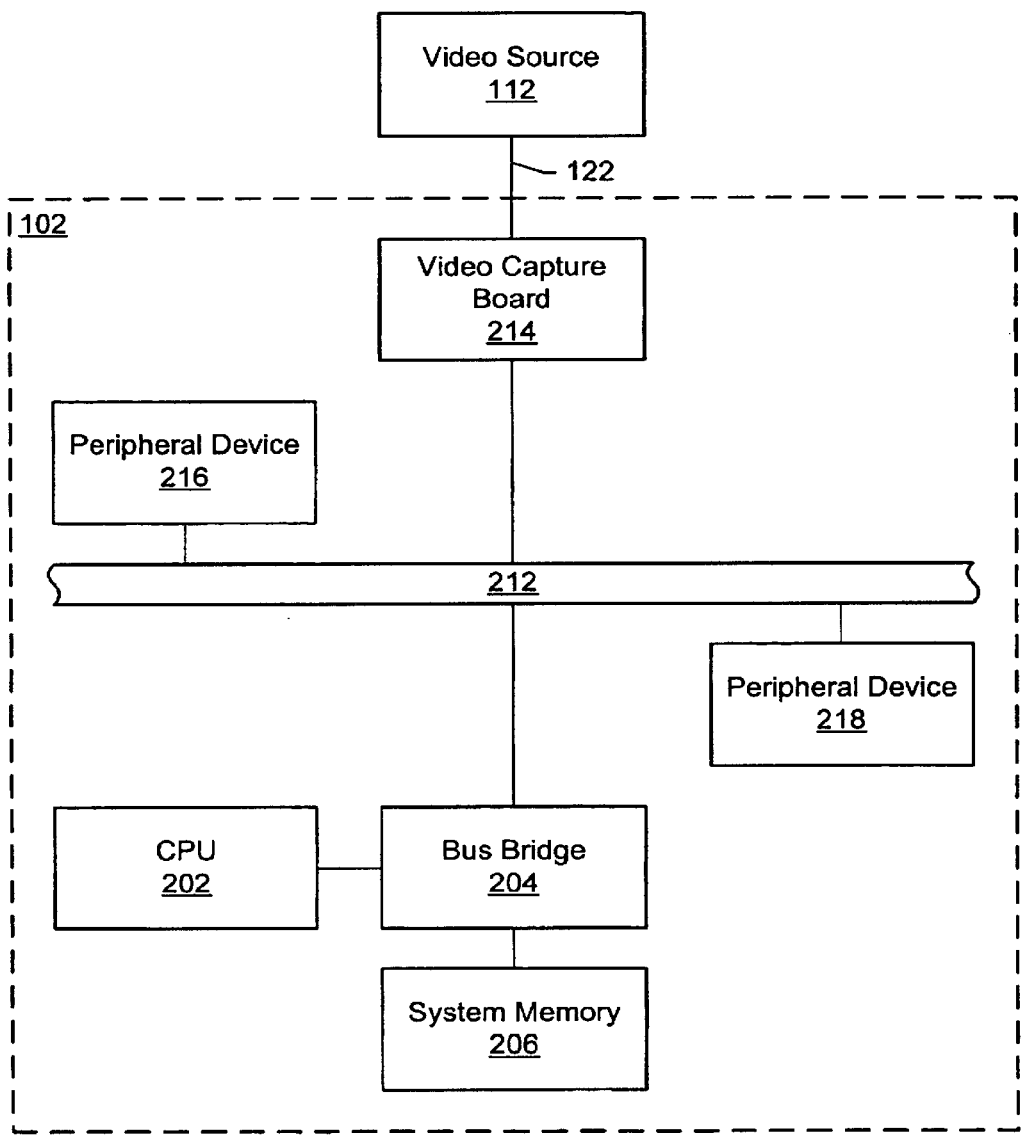
FIG. 3 is a high-level block diagram of the image acquisition system.

FIG. 3—Image Acquisition System Block Diagram

FIG. 3 is a high-level block diagram of the image acquisition system of FIG. 2 for acquiring an image for color characterization and/or color matching according to the present invention. It is noted that the block diagram of FIG. 3 is exemplary only, and other computer system architectures may be used as desired. For example, the present invention may be implemented in a "smart camera", which integrates a sensor, analog to digital (A/D) converter, CPU and communications devices together in a single unit. The present invention may be embodied in other architectures, devices, or embodiments, as desired.

As shown in FIG. 3, the host computer 102 preferably comprises a CPU 202, a bus bridge 204, system memory 206, and a peripheral bus 212. The CPU 202 is coupled to the bus bridge 204. The bus bridge 204 is coupled to the system memory 206 and the CPU 202, and couples to the peripheral bus 212. In the preferred embodiment, the peripheral bus 212 is the PCI expansion bus, although other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the analog or digital video signals to the video capture board 214. The video capture board 214 transfers digitized video frames to the system memory 206 through peripheral bus 212 and bus bridge 204. In this embodiment, the video capture board 214 acquires the target image and transfers it to system memory 206. The user of the computer 102 may then select one or more regions of interest (ROI) in the image for color characterization and matching.

In a color characterization application, the system memory 206 may store an image object. The system memory 206 also preferably stores software according to the present invention which operates to characterize the color information in the image object.

In a color matching application, the system memory 206 may store the color percentage information (calculated from the characterization process) of a template image object. The system memory 206 may also receive and/or store one or more other image objects, such as selected ROIs in the template image or acquired target image objects. The system memory 206 also preferably stores software according to the present invention which operates to characterize the color information in the template image object and in the one or more acquired target image objects. The software of the present invention is executable to perform color matching by comparing the color information from the template image object and any of various other image objects.

It is noted that, in a color matching application, the color percentage information of the template image object may be pre-calculated and stored in the computer, and the actual template image object is then not required to be stored or used for subsequent color matching operations with acquired target image objects. Thus, when a target image object is acquired, the color characterization software characterizes the colors in the target image object and may compare this color information with the pre-computed color information of the template image object.

The present invention is preferably implemented in one or more software programs which are executable by a processor or CPU. The software program(s) of the present invention are preferably stored in a memory medium of a computer as described above.

Figure 4:
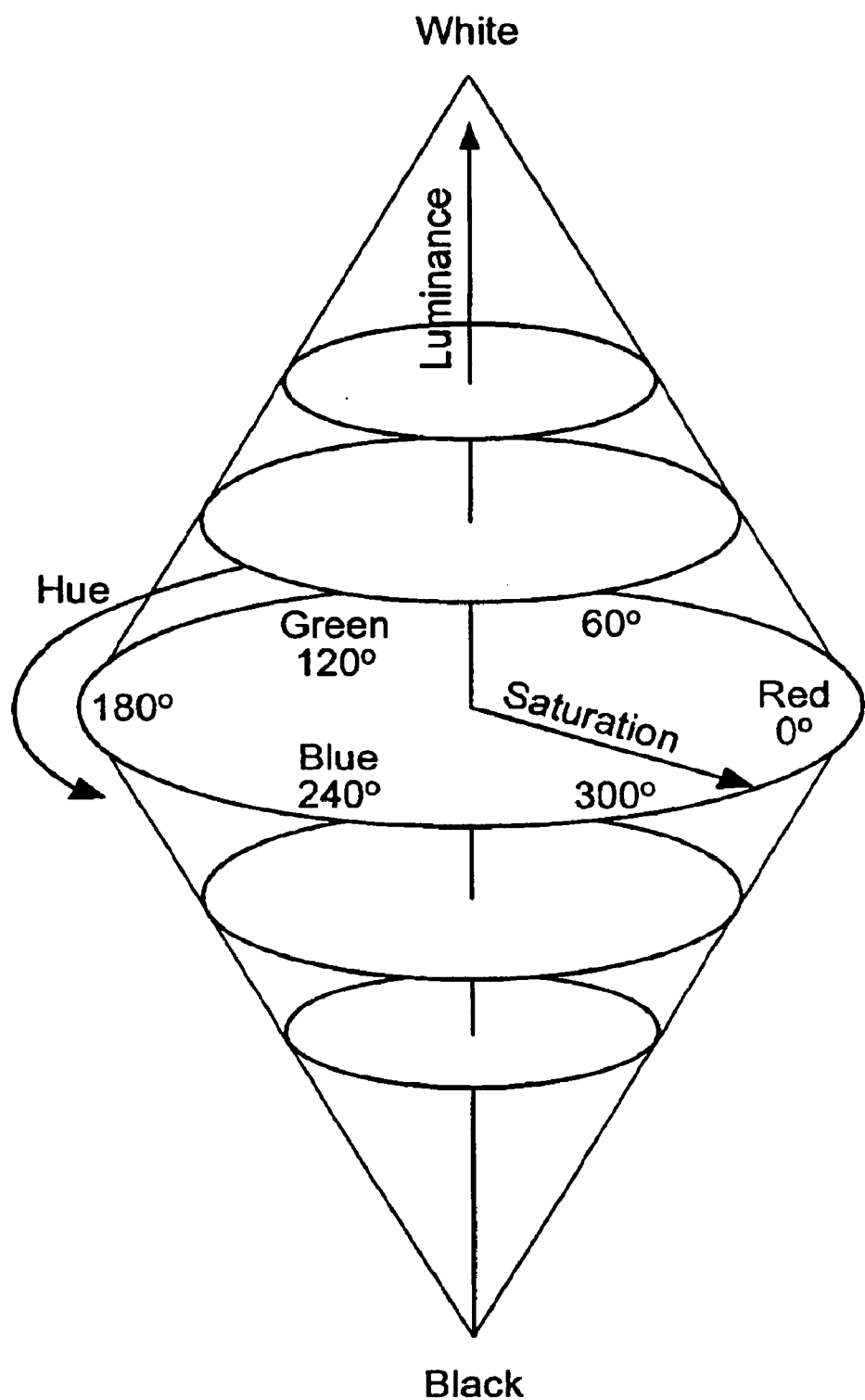
FIGS. 4, 5A and 5B are graphical representations of HSI color space.
Figure 5A:
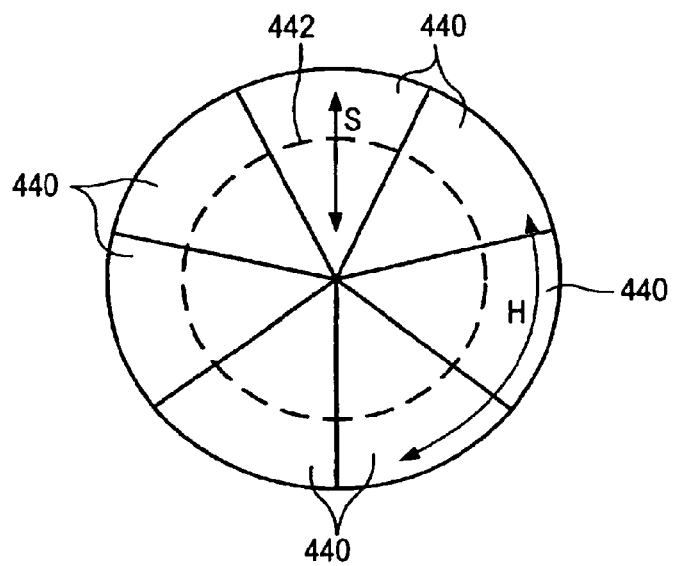
Figure 5B:
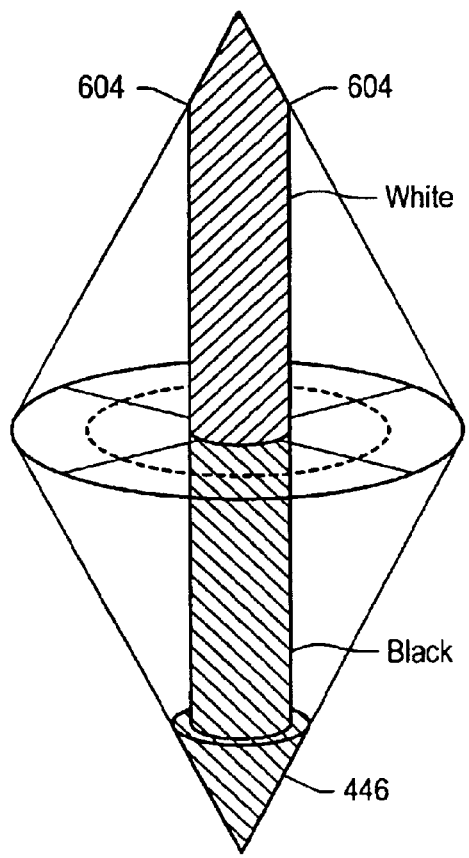

FIGS. 4, 5A, 5B—HSI Color Space

The color characterization method (FIGS. 6A and 6B) involves the analysis of the hue, saturation, and intensity of individual image object pixels and the compilation of these pixel specific results in order to characterize an image based on color. The method divides the color spectrum or color space into categories or bins (also called sub-spaces), primarily according to hue and saturation values, and then operates to assign pixels to respective ones of these bins. The total number of pixels (or percentage of pixels) in an image object that fall into each category or bin of the color spectrum is used as the basis of the color characterization.

FIG. 4 illustrates the possible hue, saturation and intensity values (the color spectrum) as a 3-dimensional space or volume. The color information of a pixel may be represented as a vector or point within the 3D color space or volume of FIG. 4. The vector's location represents the hue, saturation, and intensity of the pixel.

Hue represents the color shade of a pixel and is shown as an angle of a radial line in the circle in FIG. 4. FIG. 5A illustrates a cross section of FIG. 4. As shown in FIG. 5A, hue is represented as an angular value ranging from 0–360 degrees.

Saturation refers to a color's freedom from mixture or dilution with white. Saturation is represented in FIG. 4 as the radial distance of a line on the circle, i.e., the distance from the center of the circle. Saturation may be more easily seen in the cross section of FIG. 5A. Saturation typically is measured in the range of 0 to 1, with 0 being at the center of the circle and 1 being at the outside perimeter of the circle. Thus, hue and saturation are essentially represented in polar coordinates to describe a point or location on the circle of FIGS. 4 and 5A.

Intensity, sometimes referred to as light or luminance, refers to the degree of shade in a pixel and is represented on the vertical scale of FIG. 4, i.e., vector locations above or below the circle. The terms luminance and intensity are interchangeable throughout this description. Intensity values typically range from 0 to 1 with 0 being pure black and 1 being pure white. The intensity value 0 is represented at the apex of the bottom cone, and the intensity value 1 is represented at the apex of the top cone.

In one embodiment, the color characterization of an image is the same for both a template and a target image in a color matching method (e.g. in FIG. 8, steps 304 and 308 use the same method applied to different image regions).

Before color characterization can occur, the color space of FIG. 4 is partitioned into color categories. A user may set the color characterization level of complexity, which determines the number of different color categories or bins in which the 3D color space of FIG. 4 is partitioned or divided. The number of categories or bins hence determines the granularity or resolution of the color characterization. One embodiment includes three possible complexity levels, these being low, medium and high.

In the preferred embodiment, the low complexity level comprises 16 possible categories or bins. In the low complexity level, the hue plane (FIG. 5A) is divided into seven different bins 440 for the seven possible natural colors, and the saturation plane is divided into two regions, thereby creating 14 (7×2) bins. The seven possible natural colors comprise the 7 standard colors of the color spectrum, these being: red, orange, yellow, green, blue, indigo and violet. In the low complexity level, the hue plane is divided into seven pie-shaped wedges, and the saturation plane is further sub-divided into 2 regions defined by a radial distance threshold 442, preferably 0.3 on a scale from 0 to 1, thereby creating 14 possible categories or bins in the hue/saturation plane. Two additional color categories are allotted for the pixel being black or white, thereby creating a total of 16 possible categories (14+2).

FIG. 5B illustrates the areas within HSI color space which may be categorized as either black or white. In general, the color of a specific pixel may be characterized as either black or white if the saturation value is very low. There will be more discussion about the black and white categories with respect to the color characterization method of FIGS. 6A and 6B.

The medium complexity level may comprise 30 possible categories or bins. In the medium complexity level, the hue plane (FIG. 5A) is divided into 14 different color categories 440 and the saturation plane is divided into two regions, thereby creating 28 (14×2) bins. Thus, in the medium complexity level, the hue plane is divided into 14 pie-shaped wedges, and the saturation plane is further sub-divided into 2 regions defined by a radial distance threshold 442, preferably 0.3 on a scale from 0 to 1, thereby creating 28 possible color categories or bins in the hue/saturation plane. Two additional color categories are allotted for the pixel being black or white, thereby creating a total of 30 possible color categories (28+2).

The high complexity level may comprise 58 possible color categories or bins. In the high complexity level, the hue plane (FIG. 5A) is divided into 28 different bins 440, and the saturation plane is divided into two regions, thereby creating 56 (28×2) bins. Thus, in the high complexity level, the hue plane is divided into 28 pie-shaped wedges, and the saturation plane is further sub-divided into 2 regions defined by a radial distance threshold 442, preferably 0.3 on a scale from 0 to 1, thereby creating 56 possible color categories or bins in the hue/saturation plane. Two additional color categories are allotted for the pixel being black or white, thereby creating a total of 58 possible categories (56+2).

The saturation categorization, i.e., the location of the radial distance threshold 442, is preferably set to a default value, but may also be adjusted by the user setting the Learn Sat Threshold 604. The saturation threshold typically is only adjusted when color characterization is performed on images with little variance in color saturation. In another embodiment, the number of saturation divisions may be increased, for example, to 3 (or more), or may be decreased to 0 (i.e. colors are not divided with respect to saturation level).

Figure 6A:
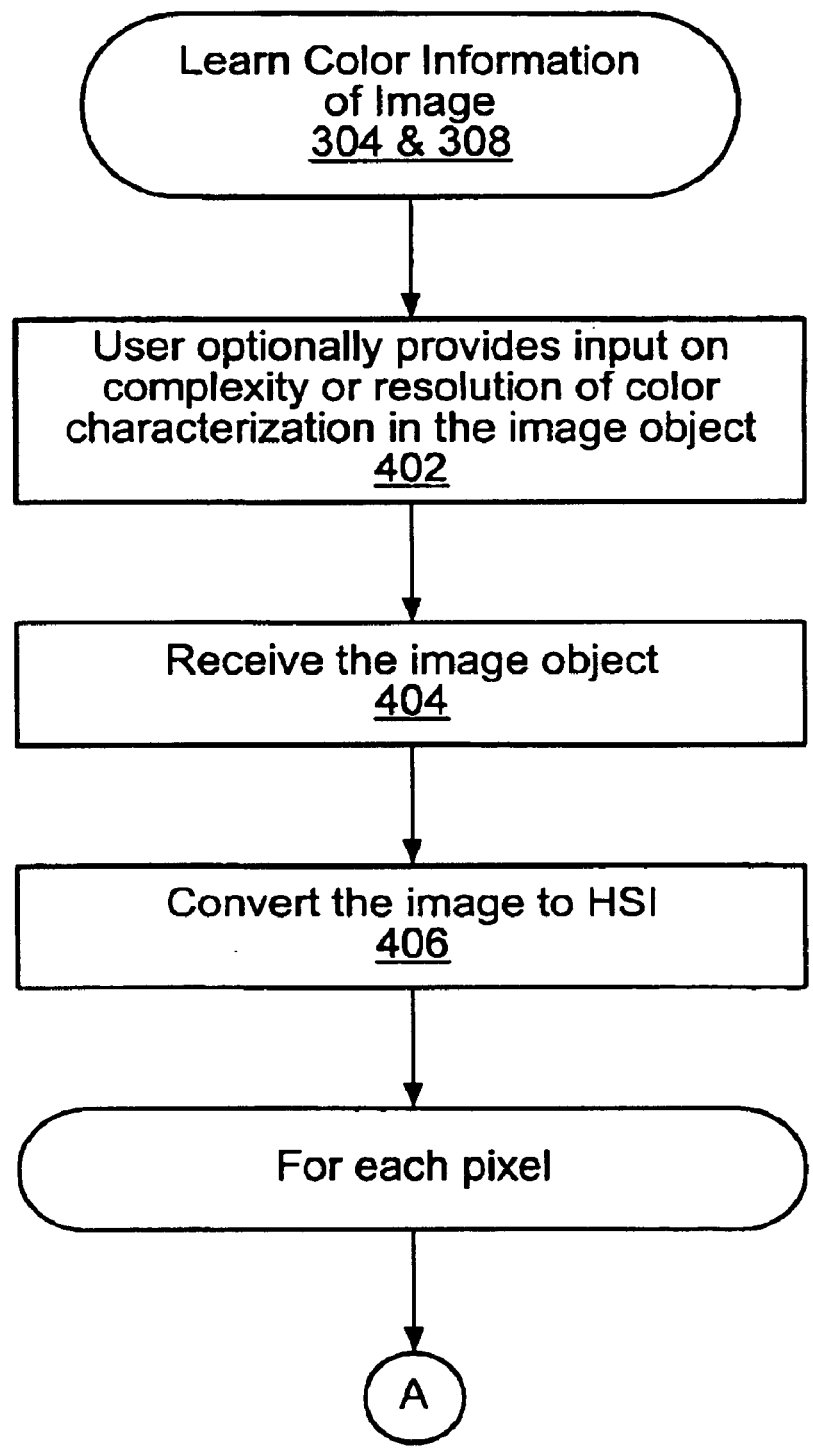
FIGS. 6A and 6B are a flowchart illustrating the method of acquiring color characterization data of an image through a color learning process.
Figure 6B:
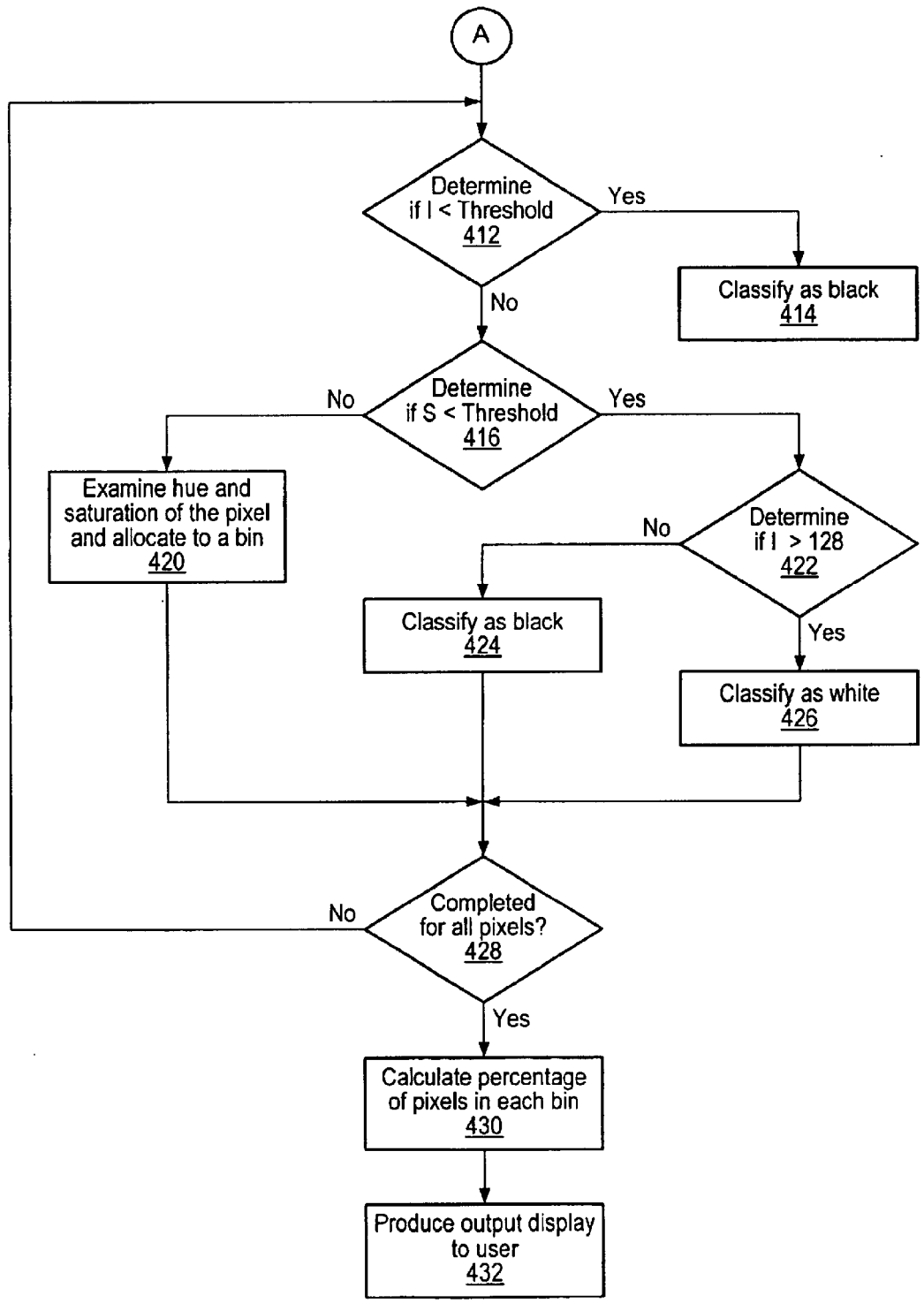

FIGS. 6A and 6B—Color Characterization of an Image (Learning Color Information)

FIGS. 6A and 6B are flowchart diagrams illustrating the color characterization of an image. The color characterization method described in the flowchart of FIGS. 6A and 6B may be used in many applications including the color matching method of FIGS. 8A and 8B.

In step 402 the user may optionally select a level of color complexity 602 (FIG. 9), i.e., the resolution of color information. In one embodiment, the user may select one of three complexity levels, these being low, medium and high. It is noted that the number of color categories (i.e. the color complexity) may be set to any number or level, as desired.

In step 404 the color characterization method receives an image object to be characterized. In a color matching application the image object may be either a template image object or a target image object (or ROI). The image object may already be stored on a memory medium of the computer 102, or the image object may be received from any source, including a scanner, digital camera, floppy disk, Internet transmission, graphics software, or any other available means.

The method may first determine the format of color information of the pixels in the image object and display the Image Type 622 to the user. Images are typically stored in RGB (Red, Green, Blue), Redness/Greenness, CMY, or HSI format. The color characterization method of the preferred embodiment uses the HSI format in the color characterization process. Thus, if an image object is not in HSI format when received, it is automatically converted to HSI format in step 406. The conversion process, when necessary, analyzes an image, pixel by pixel, applying an algorithm that converts the current color format to the HSI format.

It is noted that the present invention may be used with other color representation formats, such as RGB, CMY, and others. Thus, in these embodiments, for example, the present invention may divide the RGB or CMY color spectrums into color categories or bins and operate to assign pixels to these bins.

FIG. 6B is a continuation of FIG. 6A and comprises a method that may be performed for each respective pixel of an image object to perform color characterization of the image object.

The steps in FIG. 6B are preferably performed for all of the pixels of the image object. Alternatively, the steps in FIG. 6B may be performed for only a subset of the pixels of the image object. For example, the steps in FIG. 6B may be performed for sample pixels which themselves represent or characterize the image. These sample pixels may be generated by any of various sampling techniques, such as grid-based sampling, random sampling, or other non-uniform sampling. Steps 412, 414, 416, 422, 424 and 426 involve threshold comparisons that are used to determine if the pixel has a saturation and/or intensity value that indicates the pixel is white or black.

In step 412 the method determines if the intensity value of the pixel is below a certain threshold, which could be specified by the user as some small value close to 0. FIG. 5B illustrates the intensity threshold 446. The intensity threshold 446 is preferably a decreasing function of the saturation. The intensity threshold 446 may be set by the computer or in some embodiments may be selected by the user. In one embodiment, on the assumption that hue, saturation and intensity values have been normalized to range from 0 to 255, the intensity threshold BlkThreshold is specified as a function of the saturation as shown below:

$$BlkThreshold = \begin{cases} 128 & \text{for } sat < 10 \\ (128-5)\exp[-0.025 \times (sat-10)] + 5 & \text{for } 10 \leq sat \leq 200 \\ 5 & \text{for } 200 < sat \end{cases}$$

If a pixel's intensity is smaller than BlkThreshold, then in step 414 the pixel is immediately categorized as black. In this case, no further color learning is performed on the pixel. The threshold comparison performed in step 412 saves computer cycles by not requiring further HSI analysis on a pixel that is black based strictly on its low intensity. If the intensity value of the pixel is above the intensity threshold of step 412, then operations proceed to step 416, and further color categorizations are applied.

In step 416 the saturation value of the pixel is examined. If the saturation of a pixel is very low, different colors are not distinguishable and the pixel may immediately be categorized as either black or white. When a pixel's saturation is close to the minimum saturation level, the pixel may be graphically represented near the origin of the circle of FIGS. 5B. Step 416 determines if a pixel's saturation is lower than a selected saturation threshold 604 (FIG. 5B), i.e., is very close to 0. In one embodiment, the Saturation Threshold 604 has a default value of 10 on a scale from 0 to 255 (this corresponds to a default value of 0.04 on a scale from 0 to 1). If the saturation level of a pixel is below the saturation threshold, the pixel does not require further saturation analysis or the hue analysis of step 418 so the process advances to step 422.

In step 422 a pixel (which has a very low saturation value) is examined based on its intensity value. A pixel that has very low saturation (i.e. is below the saturation threshold) is categorized as either black or white based on which half of the intensity plane the pixel resides. In other words, the hue and saturation analysis of step 420 is not necessary because a pixel with a saturation value less than the saturation threshold can not be distinguished from other pixels with similar saturation values and different hue values. In step 424, if the pixel is on the lower half of the intensity plane, i.e., I<=BlkWhiteThreshold, the pixel is categorized as black. In step 426, if the pixel is on the upper half of the intensity plane, i.e., I>BlkWhiteThreshold, the pixel is categorized as white. BlkWhiteThreshold may be pre-specified based on the importance of white or black color in the applications. In one embodiment, the threshold may be set at the median value, 128 on a scale from 0 to 255 (this corresponds to a default value of 0.5 on a scale from 0 to 1), which puts the same weight on white and black colors. After a pixel is categorized as either black or white, the method continues to step 428.

If the saturation of a pixel is more than the saturation threshold 604 in step 416, then hue and saturation analysis are performed in step 420. In step 420, the hue and saturation values of the pixels are analyzed, and the pixel is assigned to one of the bins in the hue/saturation plane based on these values.

As described above, FIG. 5A illustrates the hue/saturation plane, wherein hue is categorized by a color's angular orientation (from 0 to 360 degrees) on the cross sectional plane of FIG. 5A, and saturation is categorized as the color's radial distance on the cross sectional plane of FIG. 5A. Hue characterization may divide the hue plane into, for example, 7, 14, or 28 bins (for low, medium, or high complexity) depending on the selected Color Complexity 602 (FIG. 9), and the bins are further split in half by a radial distance value, represented by circle 442 (FIG. 5A), that allows categorization according to saturation within each hue bin. This doubles the total number of bins, or categories, in the hue/saturation plane to 14, 28, or 56, respectively.

If the current pixel being analyzed is the last pixel to be analyzed as determined in step 428, then operation completes. If not, then operation returns to step 412, and steps 412–428 are repeated. The color categorization process is repeated for at least a subset of the pixels, and preferably every pixel, until all are categorized. As each subsequent pixel is categorized, a running total of the number of pixels assigned to each bin is stored in memory. In the preferred embodiment, the pixels are assigned to N categories or bins, where N=C*2+2 (where C=7, 14, or 28 depending on the selected complexity). The number N of bins or color categories may of course be adjusted by changing one or more of the number of hue divisions and saturation divisions.

After each pixel has been examined and placed in one of the N categories, in step 430 the method calculates color parameters, such as the percentage of pixels in each bin, i.e., the number of pixels in each bin in relation to the total number of pixels. These calculations will result in N percentages whose sum is equal to 100%. Percentages are used, rather than raw data, to allow matching of differently shaped, scaled and rotated images. It is noted that other types of color parameters may be generated, e.g., other types of normalized values which are independent of the number of pixels in the image object. The color parameters or percentages may then be displayed to the user. The color characterization for the image object thus may produce a list or data structure that contains N percentage values or parameters representing the color characterization of the image object.

Figure 7:
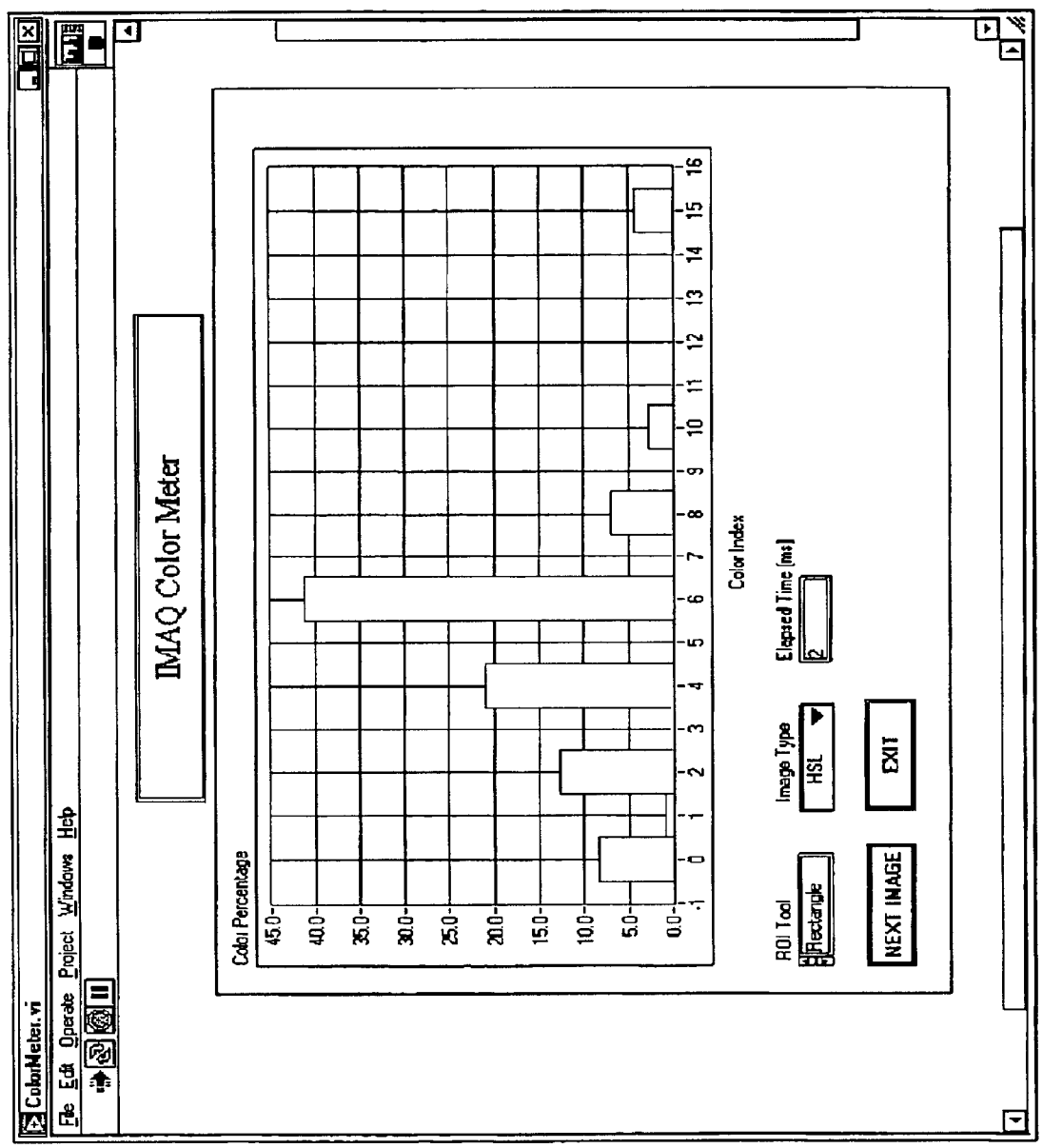
FIG. 7 is an example of a graphical representation of the color characterization data of an image.

FIG. 7—Display Color Characterization Information

FIG. 7 illustrates one example of an output created as a representation of the color characterization data of an image. FIG. 7 shows the percentage (vertical scale) of 16 defined colors (horizontal scale) as determined by the color characterization method according to the present invention as described above.

The color characterization list or data structure may further be operated upon to create a color characterization represented as a single value. The color characterization may also be represented textually (e.g., by the terms brick red, jet black, mauve, etc.) through the use of a look-up table configured according to the color categorization method of the present invention. The color characterization may also be represented graphically in various ways. The color characterization may be stored along with the image or transmitted to other computer systems for analysis or display. The color characterization may also be used as part of an image compression technique.

Figure 8A:
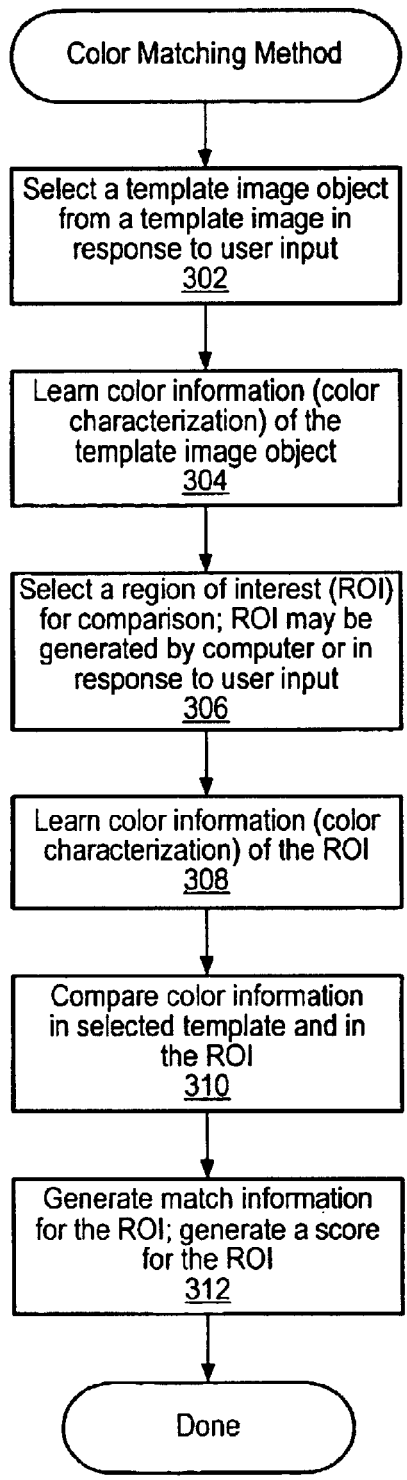
FIG. 8A is a flowchart illustrating a color matching method.
Figure 8B:
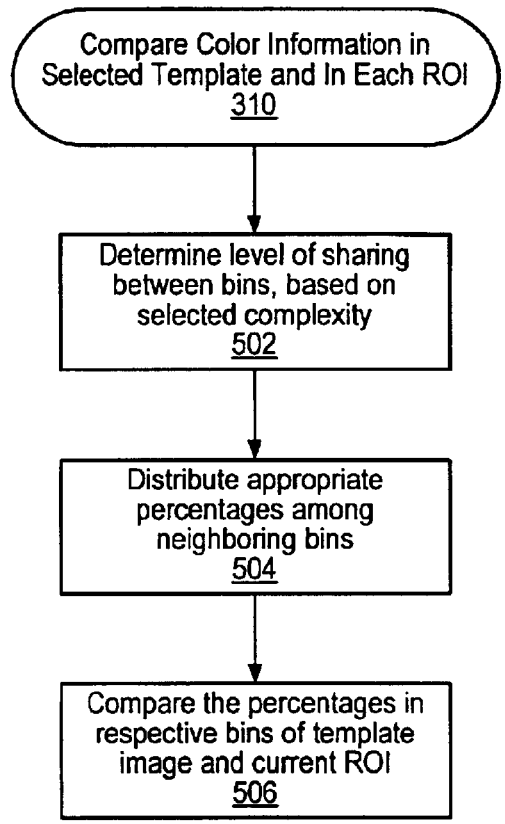
FIG. 8B is a flowchart illustrating the method of comparing template image and ROI color characterization data.

FIGS. 8A and 8B—Color Matching Method

FIG. 8 is a flowchart diagram illustrating operation of the color matching method of the present invention. It is noted that various of the steps in the flowcharts of FIGS. 6A, 6B, 8A, and 8B may occur concurrently or in different orders.

A method of color matching involves the comparison of color information in two image objects. For example, the color matching method may involve the comparison of color characterization data in a template image object or region with one or more other image objects, such as target image objects or selected ROIs, to determine the level of similarity in color.

In step 302 a template region (the template image object) is selected by the user from the received or stored template image. The template image object may be any shape, size, or orientation of a complete image or a portion of an image. The template image object may also be selected by the computer 102 according to some pre-determined criteria, e.g., the template image object may be selected by the computer 102 according to a pattern matching algorithm. The template image object may be pre-stored on the computer 102 or may be generated from the acquired template image. The template image object may also be the entire received template image, in which case no ROI selection is necessary.

Once a template image object has been selected, in step 304 the method performs a color characterization method, as described in FIGS. 6A and 6B above, on the template image object to acquire color characterization data. The color characterization method uses pixel color information, preferably the hue, saturation, and intensity (HSI) of pixels, to classify the pixels into different color categories or bins, and hence to compile color characterization data representative of the image object.

Here it is noted that the color characterization data (obtained from the characterization process) of a template image object may be pre-computed and stored in the computer memory, before receipt of any target image objects. In this case, once the color characterization data or color percentage information has been obtained and stored for the template image object, it is no longer necessary to maintain the template image object in memory during subsequent color matching operations.

The same method of color characterization that is performed on a template image object in step 304 may also be applied to the target image object or ROI in step 308, as described in FIGS. 6A and 6B. After the color characterization has been performed on a template image the color characterization data representative of the template image may be stored in memory and later retrieved for comparison to received or selected ROI's. This allows color comparisons with many different ROIs without requiring repeated characterization of the colors in the template image object. In other words, computer cycles and memory storage may be lessened by performing color comparisons using template image color characterization data stored in memory, rather than re-analyzing the colors of the template image object in relation to each ROI, e.g., performing a pixel by pixel color comparison as taught by prior art.

In step 306 a ROI, also referred to as the target image object, is selected. The ROI may be selected either manually by the user or automatically by the computer 102. The ROI may be selected from the template image or from an acquired target image. The user may select a ROI that is similar in size to the template image object or may choose a proportionally distinct area.

Figure 9:
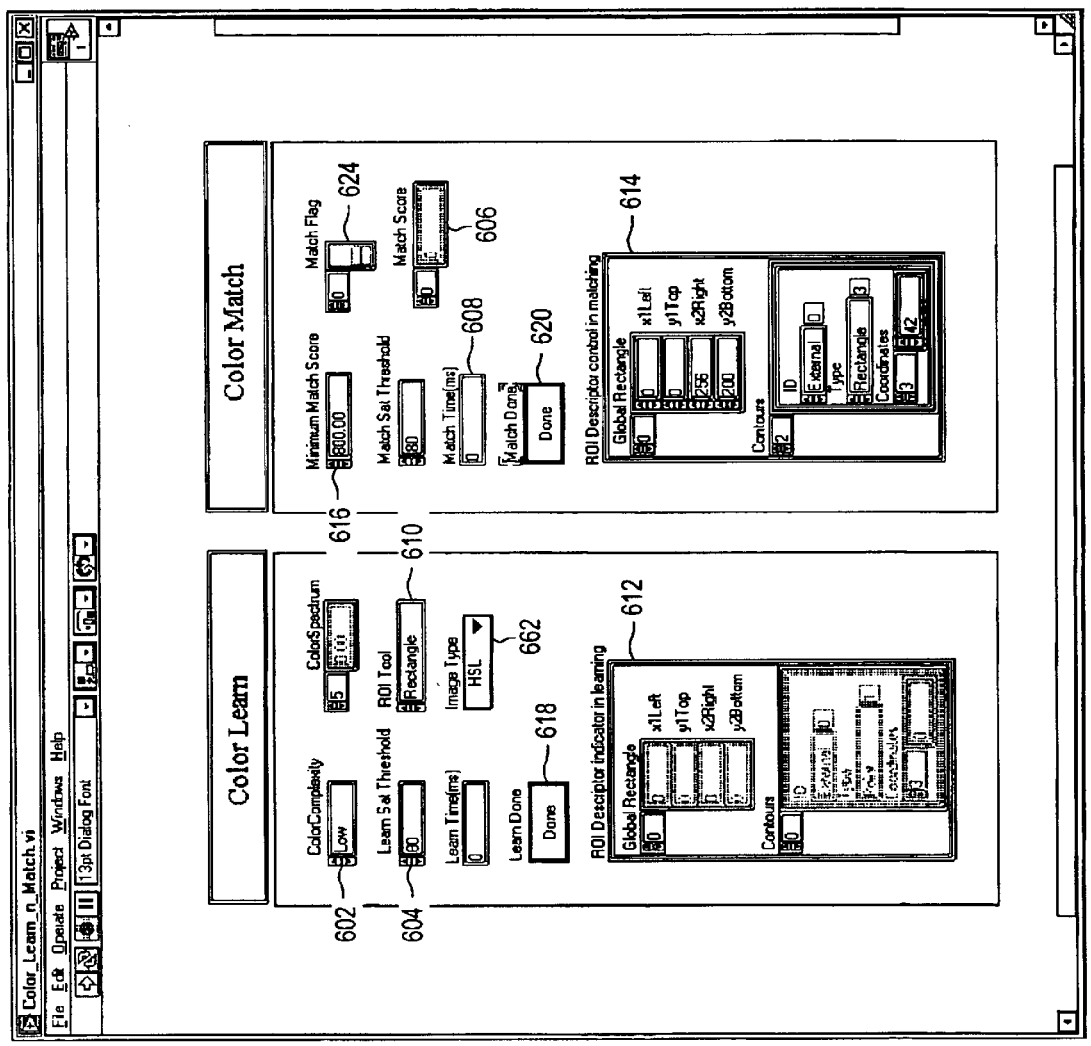
FIG. 9 is a graphical user interface (GUI) of one embodiment of color matching software according to the present invention.

The user may select the ROI using a graphical user interface (GUI), such as the LabVIEW front panel shown in FIG. 9. In FIG. 9, the ROI Tool 610 allows the user to choose from many different shapes of ROIs, including a rectangle, an oval, or a shape selected freehand. The color characterization and color matching methods of the present invention are independent of the size, shape, and/or rotation of the image objects involved. This is because the color information of the template image object and ROI are percentages of certain color characteristics (as explained in FIG. 6) and thus the size, shape, or rotation of either image object is unimportant. In other words, a 400×400 red square would have substantially or identically the same color characterization data as a 20×20 red circle (assuming the HSI component of the red in both images is identical and the GUI settings are identical).

In step 308 the method performs the color learning process (FIG. 6) on the ROI. The color learning process generates color characterization data representative of the selected target image object or ROI.

In step 310 the color characterization data representative of the template image object and the ROI are compared to determine the color similarities in the two image portions. The process, explained in detail in FIG. 8B, involves an improved method for comparing the percentages of pixels in respective color categories of the template image object and the ROI.

In step 312 a Match Score 606 (FIG. 9) may be generated based on the color comparison performed in step 310. The Match Score 606 indicates the level of color similarity between the template image object and the ROI. Match Scores 606 are preferably represented on a scale from 0 to 1000, where 0 indicates no match and 1000 indicates a perfect match. Steps 306–312 may be repeated one or more times using different target image objects or ROIs, i.e., comparing the same template image object with different ROI's. A series of Match Scores 606 may be stored in the computer memory.

As shown in the graphical user interface of FIG. 9, the Match Score for each template image object and ROI may then be compared to a Minimum Match Score 616 (FIG. 9) to determine if there is enough color similarity to classify the two objects or regions as a match. The Minimum Match Score 616 specifies the threshold for determining if there is a match between the template image and the current ROI. The user may select the degree of color similarity desired by adjusting the Minimum Match Score 616. If a Match Score 606 is greater than the selected Minimum Match Score 616, indicating a color match between the template image object and a respective ROI, then a match value is set in a Match Flag array 624 for the respective ROI. The Match Flag 624 is an array containing Boolean information that indicates whether there is a match between the color characterization data representative of the template image object and the color characterization data representative of each ROI. The Match Flag 624 array may be used to quickly identify the number of matches that were found among a group of selected ROI's.

FIG. 8B—Compare Color Information from Template Image Object and from a ROI

As described above with respect to FIG. 8A, the color characterization described above with respect to FIGS. 6A and 6B may be performed for each of the template image object and the ROI. The color characterization for the template image object and the ROI produces two lists or data structures, each containing N percentage values. These lists are each referred to generally as color characterization data, color percentage data, color information, or simply as information which characterizes colors in the respective image object. The level of color similarity in the template image object and the ROI is determined by comparing the color characterization data of the two image objects. In one embodiment, for each color category, the respective percentage values may be subtracted from one another, resulting in N difference values. The closer each of the difference values is to zero, the more similarity there is between the template image object and the ROI with respect to that color category (i.e. the percentage of pixels on the template image and ROI that fall in to a particular color category are substantially the same). Each of these difference values may then be compared to a threshold to determine a "score". Alternatively, the difference values may be summed and then used to determine the degree of match.

While the above method is simple to apply and the results are easily understood, this method may not be the best method for all color matching applications. For example, consider where at least one of the 7 natural colors of the hue plane is divided into two or more bins, e.g., medium and high complexity levels. If the template image object and the ROI have colors that are very similar, it is still possible that colors from each will be assigned to neighboring bins of the same natural color in the hue plane. The results from this example would show no colors in the same bin, i.e., the results would show that the template image and ROI use completely different colors. This may not be the proper result because the colors in the template image and ROI are very similar, but happen to be in different hue categories of the same natural color. Therefore, an improved method of comparing color information of a template image object and ROI is desired.

The color comparison method shown in FIG. 8B compensates for the error discussed above. In this embodiment, the percentages of pixels in each bin are "shared with" or "distributed to" neighboring bins. This sharing may decrease the effects of the error discussed above.

As shown, in step 502 the level of sharing or distribution is determined according to the selected complexity level. In one embodiment, each bin shares with zero bins, one neighboring bin on each side, or two neighboring bins on each side, depending on the selected complexity level of low, medium, or high, respectively. In another embodiment, the level of sharing or distribution with neighboring bins may be determined automatically by the computer, e.g. if a certain threshold of pixels of the image object and ROI fall into respective neighboring bins (as in the example above), the method may automatically apply a level of sharing or distribution. In other words, the embodiment may automatically detect and compensate for these types of errors.

In step 504 the percentages are distributed among neighboring bins. For example, in a medium complexity color matching application, a respective bin that contains 40% of all pixels may share 10% of its total with the neighboring bins on either side. In other words, 4% (10% of 40%) would be added to the neighboring bins on either side of the respective bin. This would leave 32% in the respective bin (40%−4%−4%=32%). The neighboring bins may then undergo the same sharing process, and a certain percent may be shifted back as well as a certain percent being shifted to another neighboring bin, and so on. This type of adjustment has an effect similar to adding additional bins, making the results smoother. This adjustment may be used on both the template image and the ROI.

In step 506 the compensated percentages for the template image and ROI are compared. The comparisons may quickly be made by subtracting the percentages in respective bins of the template image and ROI and summing the results. This produces a single value that represent the degree of color similarity between the template image and ROI. The resulting value may be multiplied by a variable factor to produce the Match Score 606 (FIG. 9). The Match Score preferably ranges from 0 to 1000, where 0 indicates no match and 1000 indicates a perfect match. The variable factor is determined according to the selected settings of the current color characterizations and is used to provide the broad match range from 0 to 1000.

As discussed above in step 312 of FIG. 4, the Match Score 606 (FIG. 9) is compared to the selected Minimum Match Score 616 (FIG. 9) to determine if the colors in the current ROI match the colors in the template image object. A Match flag 624 is set when the Match Score 606 is greater than the selected Minimum Match Score 616, indicating that there is a color match. The Match Flag 624 is stored in an array of Match Flags which contains match information for the selected template compared to each ROI. The Match Flag array may be analyzed to more efficiently determine how many matches occurred among all selected ROIs.

FIG. 9—Color Matching User Interface

FIG. 9 illustrates a graphical user interface (GUI) of one embodiment of color matching software according to the present invention. The embodiment shown in FIG. 9 is implemented using software designed using LabView graphical programming software from National Instruments. A brief description of applicable GUI interfaces is given below:

ROI TOOL 610 allows the user to select different shapes of image objects and ROI's. Possible settings for ROI TOOL 610 include rectangle, oval, and freehand.

ROI DESCRIPTORS 612 and 614 contain information about the selected template image object and ROI, respectively. If the ROI Descriptor contains multiple regions, the color information in all these regions is accumulated before characterization. If the ROI Descriptor is not connected, the entire image is considered as a region.

COLOR COMPLEXITY 602 specifies the level of color complexity in the image (low, medium, or high). The level of COLOR COMPLEXITY 602 determines the number of color categories (or bins) that pixel colors will be divided in to. The default value is Low. This option should be set to High when very similar hue values need to be distinguished.

IMAGE TYPE 662 display the color format of the current image object. Color formats may include RGB, CMY, or HSI, among others.

COLOR SPECTRUM contains information about the color characterization of the image object. During the matching phase, the color information in each ROI is compared with the information contained in this array.

MINIMUM MATCH SCORE 616 specifies the threshold for color matching scores. The data range is between 0 and 1000. A match is found if the Match Score 606 is higher than this value.

MATCH SATURATION THRESHOLD 608 specifies the threshold value to distinguish two colors with the same hue value. The default value is 80, presuming a scale from 0 to 255. The value used here should be the same as that used in the color learning process (LEARN SATURATION THRESHOLD 604) of the image object and ROI.

LEARN SATURATION THRESHOLD 604 specifies the threshold value to distinguish two colors with the same hue value. The default value is 80, presuming a scale from 0 to 255.

MATCH FLAG 624 is an array containing Boolean information that indicates whether there is a match between the image object color characterization and the ROI color characterization. For each specified region in the image, the match flag is set to TRUE if its color information matches the input color information.

MATCH SCORE 606 is an array containing the match scores for each region in the image. The match scores are represented on a scale of 0 to 1000 where 0 indicates no match and 1000 indicates a perfect match.

The GUI of FIG. 9 is exemplary only, and other implementations of the present invention may be performed by other software or hardware.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer-implemented method for performing color matching between a template image object and a region of interest (ROI), wherein each of the template image object and the ROI comprises a respective plurality of pixels, the method comprising:

for each respective pixel of at least a subset of the pixels of each of the template image object and the ROI, determining a color category for the respective pixel based on hue, saturation and intensity values of the respective pixel, wherein said determining determines a color category from a plurality of possible color categories;

storing information regarding the number of pixels in each of said plurality of possible color categories of each of each of the template image object and the ROI, wherein said information characterizes colors in the image object; and generating match information based on the color information of the template image object and the color information of the ROI, wherein said match information indicates the similarity of colors between the template image object and the ROI.

2. The method of claim 1, wherein the method operates for all of the plurality of pixels in one or more of the template image object and the ROI.

3. The method of claim 1, wherein said plurality of possible color categories comprise color categories of a color space.

4. The method of claim 1, wherein the number of said color categories is dependent on a desired complexity of the color characterization.

5. The method of claim 1, further comprising:

receiving user input indicating a desired complexity of color characterization;

wherein the number of said color categories is dependent on the desired complexity of color characterization.

6. The method of claim 1, wherein said determining includes:

determining if the respective pixel can be categorized as either black or white based on one or more of saturation and intensity values of the respective pixel;

assigning the respective pixel to a black or white category if the respective pixel can be categorized as black or white, respectively;

determining a color category for the respective pixel based on hue and saturation values of the respective pixel if the respective pixel can not be categorized as either black or white.

7. The method of claim 1, further comprising;

performing a smoothing operation on said information after said storing.

8. The method of claim 7, wherein said smoothing operation comprises:

for each respective color category of at least a subset of said plurality of possible color categories, distributing a portion of the number of pixels in the respective color category to one or more neighboring color categories.

9. The method of claim 1, wherein said information includes percentage information of the percentage of pixels in each of said plurality of possible color categories, wherein said percentage information characterizes colors in one or more of the template image object and the ROI.

10. The method of claim 9, further comprising;

performing a smoothing operation on said percentage information after said storing;

wherein said smoothing operation comprises:

for each respective color category of at least a subset of said plurality of possible color categories, distributing a portion of the percentage of the number of pixels in the respective color category to one or more neighboring categories.

11. The method of claim 1, wherein the ROI comprises a portion of an image.

12. The method of claim 1, further comprising:

receiving one or more of the template image object and the ROI;

storing one or more of the template image object and the ROI in a memory of a computer;

wherein said receiving and said storing are performed prior to said determining a color category and said storing information.

13. The method of claim 1, further comprising:

converting one or more of the template image object and the ROI to hue, saturation, and intensity (HSI) format prior to said determining a color category and said storing information.

14. A computer-implemented method for performing color matching between a template image object and a region of interest (ROI), wherein each of the template image object and the ROI comprises a respective plurality of pixels, the method comprising:

analyzing each of at least a subset of the pixels, wherein, for each respective pixel, said analyzing comprises:
analyzing two or more of the hue, saturation, and intensity values of the respective pixel;
determining a color category for the respective pixel based on the two or more of the hue, saturation, and intensity values, wherein said determining determines a color category from a plurality of possible color categories;
storing information in the computer regarding the number of pixels in each of said plurality of possible color categories, wherein said information characterizes colors in each of the template image object and the ROI; and
generating match information based on the information of the template image object and the information of the ROI, wherein said match information indicates the similarity of colors between the template image object and the ROI.

15. A computer-implemented method for performing color matching between a template image object and a region of interest (ROI), wherein each of the template image object and the ROI comprises a respective plurality of pixels, wherein the method operates for at least a subset of the pixels, wherein, for each respective pixel of the at least a subset of the plurality of pixels, the method comprises:

analyzing two or more of the hue, saturation, and intensity values of the respective pixel;
determining a color category for the respective pixel based on the two or more of the hue, saturation, and intensity values, wherein said determining determines a color category from a plurality of possible color categories, thereby generating color information of the template image object and the ROI;
wherein the number of pixels in each of said color categories operates to characterize colors in each of the template image object and the ROI; and
generating match information based on the color information of the template image object and the color information of the ROI, wherein said match information indicates the similarity of colors between the template image object and the ROI.

16. The method of claim 15, further comprising:

storing information in the computer regarding the number of pixels in each of said plurality of possible color categories, wherein said information characterizes colors in one or more of the template image object and the ROI.

17. A computer-implemented method for performing color matching between a template image object and a region of interest (ROI), wherein each of the template image object and the ROI comprises a respective plurality of pixels, the method comprising:

for each of the template image object and the ROI,
for each respective pixel of at least a subset of the pixels, determining a color category for the respective pixel based on values of the respective pixel, wherein said determining determines a color category from a plurality of possible color categories, wherein said plurality of possible color categories comprise color categories of a color space;
storing information in the computer regarding the number of pixels in each of said plurality of possible color categories, wherein said information characterizes colors; and generating match information based on the information of the template image object and the information of the ROI, wherein said match information indicates the similarity of colors between the template image object and the ROI.

18. The method of claim 17, wherein the method operates for all of the plurality of pixels in one or more of the template image object and the ROI.

19. The method of claim 17, wherein the number of said color categories is dependent on a desired complexity of the color characterization.

20. The method of claim 17, further comprising;

performing a smoothing operation on said information after said storing.

21. The method of claim 20, wherein said smoothing operation comprises:

for each respective color category of at least a subset of said plurality of possible color categories, distributing a portion of the number of pixels in the respective color category to one or more neighboring color categories.

22. The method of claim 17, wherein said storing information includes calculating percentage information of the number of pixels in each of said plurality of possible color categories, wherein said percentage information characterizes colors in one or more of the template image object and the ROI.

23. A memory medium comprising program instructions for determining similarity of colors between a template image object and a region of interest (ROI), wherein each of the template image object and the ROI comprises a respective plurality of pixels, wherein the program instructions are executable to implement:

for each of the template image object and the ROI,
for each respective pixel of at least a subset of the pixels, determining a color category for the respective pixel based on hue and saturation values of the respective pixel, wherein said determining determines a color category from a plurality of possible color categories;
storing information in the computer regarding the number of pixels in each of said plurality of possible color categories, wherein said information characterizes colors in; and generating match information based on the color information of the template image object and the color information of the ROI, wherein said match information indicates the similarity of colors between the template image object and the ROI.

24. The memory medium of claim 23, wherein said plurality of possible color categories comprise color categories of a color space.

25. The memory medium of claim 23, wherein the number of said color categories is dependent on a desired complexity of the color characterization.

26. The memory medium of claim 23, further comprising;
performing a smoothing operation on said information after said storing.

27. A system for determining similarity of colors between a template image object and a region of interest (ROI), wherein each of the template image object and the ROI comprises a respective plurality of pixels, the system comprising:
a processor;
a memory medium coupled to the processor which stores each of the template image object and the ROI, wherein the memory medium also stores a color characterization program;
wherein the processor is operable to execute the color characterization program to:
for each of the template image object and the ROI,
for each respective pixel of at least a subset of the pixels, determine a color category for the respective pixel based on hue and saturation values of the respective pixel, wherein said determining determines a color category from a plurality of possible color categories;
store information in the memory medium regarding the number of pixels in each of said plurality of possible color categories, wherein said information characterizes colors in each of the template image object and the ROI; and
generating match information based on the color information of the template image object and the color information of the ROI, wherein said match information indicates the similarity of colors between the template image object and the ROI.

28. The system of claim 27, wherein said plurality of possible color categories comprise color categories of a color space.

29. The system of claim 27, wherein the number of said color categories is dependent on a desired complexity of the color characterization.

30. A method for determining similarity of colors between a template image object and a region of interest (ROI), comprising:
determining color information in the template image object, wherein the template image object comprises a plurality of template image object pixels, wherein said color information comprises information regarding a number of template image object pixels in each of a plurality of color categories;
determining color information in the ROI, wherein the ROI comprises a plurality of ROI pixels, wherein said color information comprises information regarding a number of ROI pixels in each of the plurality of color categories;
generating match information based on the color information of the template image object and the color information of the ROI, wherein said match information indicates the similarity of colors between the template image object and the ROI.

31. The method of claim 30, wherein said plurality of color categories comprise color categories of a color space.

32. The method of claim 30, wherein said plurality of color categories comprise color categories of the HSI color space.

33. The method of claim 30, wherein the number of said color categories is dependent on a desired complexity of a color characterization of the template image object and the ROI.

34. The method of claim 30, wherein said generating match information includes comparing the color information of the template image object and the color information of the ROI.

35. The method of claim 34, wherein said comparing includes, for each respective color category, comparing the number of template image object pixels in the respective color category with the number of ROI pixels in the respective color category.

36. The method of claim 34, wherein the color information of the template image object comprises information regarding a percentage of template image object pixels in each of the plurality of color categories;
wherein the color information of the ROI comprises information regarding a percentage of ROI pixels in each of the plurality of color categories;
wherein said comparing includes, for each respective color category, comparing the percentage of template image object pixels in the respective color category with the percentage of ROI pixels in the respective color category.

37. The method of claim 30, wherein the color information of the template image object comprises information regarding a percentage of template image object pixels in each of the plurality of color categories;
wherein the color information of the ROI comprises information regarding a percentage of ROI pixels in each of the plurality of color categories;
wherein said generating match information includes, for each respective color category, subtracting the percentage of template image object pixels in the respective color category from the percentage of ROI pixels in the respective color category.

38. The method of claim 30, wherein, for each of the template image object and the ROI, said determining color information comprises:
for each respective pixel of at least a subset of the pixels, determining a color category for the respective pixel based on hue and saturation values of the respective pixel, wherein said determining determines a color category from the plurality of color categories;
storing information in the computer regarding the number of pixels in each of said plurality of color categories.

39. The method of claim 38, further comprising;
performing a smoothing operation on said information after said storing.

40. The method of claim 39, wherein said smoothing operation comprises:
for each respective color category of at least a subset of said plurality of possible color categories, distributing a portion of the number of pixels in the respective color category to one or more neighboring color categories.

41. A memory medium comprising program instructions for determining similarity of colors between a template image object and a region of interest (ROI), wherein the program instructions are executable to implement:
determining color information in the template image object, wherein the template image object comprises a plurality of template image object pixels, wherein said color information comprises information regarding a number of template image object pixels in each of a plurality of color categories;

determining color information in the ROI, wherein the ROI comprises a plurality of ROI pixels, wherein said color information comprises information regarding a number of ROI pixels in each of the plurality of color categories;

generating match information based on the color information of the template image object and the color information of the ROI, wherein said match information indicates the similarity of colors between the template image object and the ROI.

42. A memory medium comprising program instructions for determining similarity of colors between a template image object and a region of interest (ROI), wherein the memory medium stores color information corresponding to the template image object, wherein said color information comprises information regarding a number of template image object pixels in each of a plurality of color categories;

wherein the program instructions are executable to implement:

determining color information in the ROI, wherein the ROI comprises a plurality of ROI pixels, wherein said color information comprises information regarding a number of ROI pixels in each of the plurality of color categories;

generating match information based on the color information of the template image object and the color information of the ROI, wherein said match information indicates the similarity of colors between the template image object and the ROI.

43. A system for determining similarity of colors between a template image object and a region of interest (ROI), the system comprising:

a processor;

a memory medium coupled to the processor which stores color information corresponding to the template image object, wherein said color information comprises information regarding a number of template image object pixels in each of a plurality of color categories;

wherein the memory medium also stores a color matching program;

wherein the processor is operable to execute the color matching program to:

determine color information in the ROI, wherein the ROI comprises a plurality of ROI pixels, wherein said color information comprises information regarding a number of ROI pixels in each of the plurality of color categories;

generate match information based on the color information of the template image object and the color information of the ROI, wherein said match information indicates the similarity of colors between the template image object and the ROI.

44. A method for producing a more robust color characterization of an image object by sharing color information between neighboring color categories, comprising:

receiving said color information for an image object;

selecting a color category from the said received color information for the image object;

determining color categories to receive compensation from said selected color category;

determining a percentage of said selected color category to be distributed to said determined number of said neighboring color categories;

distributing said percentages to said number of neighboring color categories.

45. The method of claim 44, wherein the number of neighboring color categories to receive compensation is selected by the user.

46. The method of claim 44, wherein the number of neighboring color categories to receive compensation is automatically calculated according to the color information of the image object.

* * * * *

UNITED STATES PATENT AND TRADEMARK OFFICE
CERTIFICATE OF CORRECTION

PATENT NO.    : 6,757,428 B1
DATED         : June 29, 2004
INVENTOR(S)   : Lin et al.

It is certified that error appears in the above-identified patent and that said Letters Patent is hereby corrected as shown below:

Column 24,
Line 25, please delete "determining color categories to receive compensation" and substitute -- determining a number of said neighboring color categories to receive compensation --.

Signed and Sealed this

Seventh Day of September, 2004

JON W. DUDAS
*Director of the United States Patent and Trademark Office*